(12) United States Patent
Zhang et al.

(10) Patent No.: US 12,109,520 B2
(45) Date of Patent: Oct. 8, 2024

(54) MULTI-LAYER, BIODEGRADABLE COMPOSITES FOR AIR FILTRATION

(71) Applicant: 3M INNOVATIVE PROPERTIES COMPANY, St. Paul, MN (US)

(72) Inventors: Zhiqun Zhang, North Oaks, MN (US); Michael R. Berrigan, Oakdale, MN (US); Ignatius A. Kadoma, Cottage Grove, MN (US); Bryan L. Gerhardt, Woodbury, MN (US); Liming Song, Woodbury, MN (US); John D. Stelter, Osceola, WI (US); Zackary J. Becker, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 569 days.

(21) Appl. No.: 17/422,560

(22) PCT Filed: Jan. 17, 2020

(86) PCT No.: PCT/IB2020/050361
§ 371 (c)(1),
(2) Date: Jul. 13, 2021

(87) PCT Pub. No.: WO2020/152551
PCT Pub. Date: Jul. 30, 2020

(65) Prior Publication Data
US 2022/0096977 A1   Mar. 31, 2022

Related U.S. Application Data (60) Provisional application No. 62/794,900, filed on Jan. 21, 2019.

(51) Int. Cl.
*B01D 46/00* (2022.01)
*B01D 39/16* (2006.01)
(Continued)

(52) U.S. Cl.
CPC ........... *B01D 39/163* (2013.01); *B01D 46/10* (2013.01); *B01D 46/521* (2013.01); *B32B 5/022* (2013.01);
(Continued)

(58) Field of Classification Search
CPC .... B01D 39/163; B01D 46/10; B01D 46/521; B01D 2239/0233; B01D 2239/0266;
(Continued)

(56) References Cited

U.S. PATENT DOCUMENTS

| | | | |
|---|---|---|---|
| 3,802,817 | A | 4/1974 | Matsuki |
| 4,640,810 | A | 2/1987 | Laursen |

(Continued)

FOREIGN PATENT DOCUMENTS

| | | |
|---|---|---|
| JP | 201437081 | 2/2014 |
| WO | WO 2002-28626 | 4/2002 |

(Continued)

OTHER PUBLICATIONS

International Search Report for PCT International Application No. PCT/IB2020/050361, mailed on Mar. 16, 2020, 5 pages.

*Primary Examiner* — Frank M Lawrence, Jr.

(57) ABSTRACT

The present disclosure relates to multi-layer composite articles including at least two nonwoven web layers. Each or the layers may be a spunbonded web, and each may include biodegradable materials. The multi-layered composites of the present disclosure are particularly well suited for air filtration, as they can combine a high dust holding capacity with sufficient strength, dimensional stability, and a relatively low pressure drop.

19 Claims, 4 Drawing Sheets

(51) Int. Cl.
| | |
|---|---|
| *B01D 46/10* | (2006.01) |
| *B01D 46/52* | (2006.01) |
| *B32B 5/02* | (2006.01) |
| *B32B 5/08* | (2006.01) |
| *B32B 5/26* | (2006.01) |
| *D01F 1/10* | (2006.01) |
| *D01F 8/14* | (2006.01) |
| *D04H 1/435* | (2012.01) |
| *D04H 1/541* | (2012.01) |
| *D04H 3/011* | (2012.01) |
| *D04H 3/16* | (2006.01) |
| *F24F 8/108* | (2021.01) |

(52) U.S. Cl.
CPC ............... *B32B 5/08* (2013.01); *B32B 5/267* (2021.05); *D01F 1/10* (2013.01); *D01F 8/14* (2013.01); *D04H 1/5412* (2020.05); *D04H 3/011* (2013.01); *D04H 3/16* (2013.01); *F24F 8/108* (2021.01); *B01D 2239/0233* (2013.01); *B01D 2239/0266* (2013.01); *B01D 2239/0618* (2013.01); *B01D 2239/0627* (2013.01); *B01D 2239/065* (2013.01); *B01D 2239/10* (2013.01); *B01D 2239/1291* (2013.01); *B32B 2250/02* (2013.01); *B32B 2250/20* (2013.01); *B32B 2262/0276* (2013.01); *B32B 2262/124* (2021.05); *B32B 2307/7163* (2013.01); *B32B 2307/724* (2013.01); *B32B 2307/734* (2013.01); *D10B 2331/041* (2013.01); *D10B 2401/041* (2013.01); *D10B 2401/12* (2013.01); *D10B 2505/04* (2013.01)

(58) Field of Classification Search
CPC .... B01D 2239/0618; B01D 2239/0627; B01D 2239/065; B01D 2239/10; B01D 2239/0216; B01D 29/0095; B01D 29/016; B01D 29/031; B01D 46/0001; B32B 5/022; B32B 5/08; B32B 5/267; B32B 2250/02; B32B 2250/20; B32B 2262/0276; B32B 2262/124; B32B 2307/7163; B32B 2307/724; B32B 2307/734; B32B 5/06; B32B 5/26; B32B 7/12; B32B 2262/0253; B32B 2262/0261; B32B 2262/12; B32B 2307/718; B32B 2607/00; B32B 2264/00; B32B 2305/20; B32B 2307/72; B32B 2509/10; D01F 1/10; D01F 8/14; D04H 1/5412; D04H 3/011; D04H 3/16; D04H 1/435; F24F 8/108; D10B 2331/041; D10B 2401/041; D10B 2401/12; D10B 2505/04; D01D 5/0985; D06M 17/00; A61L 9/16

USPC .................................................... 55/521, 527
See application file for complete search history.

(56) References Cited

U.S. PATENT DOCUMENTS

| | | |
|---|---|---|
| 5,114,787 A | 5/1992 | Chaplin |
| 5,167,765 A | 12/1992 | Nielsen |
| 5,277,976 A | 1/1994 | Hogle |
| 5,510,423 A | 4/1996 | Van |
| 5,643,397 A | 7/1997 | Gorman |
| 6,177,193 B1 | 1/2001 | Tsai |
| 6,607,624 B2 | 8/2003 | Berrigan |
| 6,916,752 B2 | 7/2005 | Berrigan |
| 6,953,622 B2 | 10/2005 | Tsai |
| 7,238,634 B2 | 7/2007 | Bansal |
| 7,241,838 B2 | 7/2007 | Shelby |
| 7,790,640 B2 | 9/2010 | Chakravarty |
| 7,972,692 B2 | 7/2011 | Chakravarty |
| 8,162,153 B2 | 4/2012 | Fox |
| 8,182,725 B2 | 5/2012 | Green |
| 8,240,484 B2 | 8/2012 | Fox |
| 8,518,311 B2 | 8/2013 | He |
| 8,702,829 B2 | 4/2014 | Lise |
| 8,721,943 B2 | 5/2014 | Moore |
| 8,936,740 B2 | 1/2015 | Topolkaraev |
| 9,139,940 B2 | 9/2015 | Berrigan |
| 9,469,091 B2 | 10/2016 | Henke |
| 9,487,893 B2 | 11/2016 | Moore |
| 9,827,755 B2 | 11/2017 | Afshari |
| 10,098,980 B2 | 10/2018 | Karls |
| 10,273,612 B2 | 4/2019 | Song |
| 2005/0020172 A1 | 1/2005 | Bansal |
| 2005/0172812 A1 | 8/2005 | Ueda |
| 2008/0287026 A1 | 11/2008 | Chakravarty |
| 2012/0177888 A1* | 7/2012 | Escafere ............. B32B 5/06 28/100 |
| 2012/0234748 A1 | 9/2012 | Little |
| 2015/0135668 A1* | 5/2015 | Seeberger .......... B01D 46/0032 55/528 |
| 2015/0267927 A1 | 9/2015 | Zhang |
| 2016/0206984 A1 | 7/2016 | Berrigan |
| 2016/0257098 A1 | 9/2016 | Nissenbaum |
| 2017/0066210 A1 | 3/2017 | Wood |
| 2017/0241054 A1 | 8/2017 | Song |
| 2017/0313021 A1 | 11/2017 | Chakravarty |
| 2018/0272263 A1 | 9/2018 | Gregerson |
| 2020/0392658 A1* | 12/2020 | Ren ..................... B32B 7/12 |
| 2021/0154606 A1* | 5/2021 | Yan ................... D04H 1/548 |

FOREIGN PATENT DOCUMENTS

| | | |
|---|---|---|
| WO | WO 2017-213926 | 12/2017 |
| WO | WO 2017-222863 | 12/2017 |
| WO | WO 2018-090279 | 5/2018 |
| WO | WO 2018-090280 | 5/2018 |
| WO | WO 2018-165314 | 9/2018 |

\* cited by examiner

MULTI-LAYER, BIODEGRADABLE COMPOSITES FOR AIR FILTRATION

CROSS REFERENCE TO RELATED APPLICATIONS

This application is a national stage filing under 35 U.S.C. 371 of PCT/IB2020/050361, filed 17 Jan. 2020, which claims the benefit of U.S. Provisional Application No. 62/794,900, filed 21 Jan. 2019, the disclosures of which are incorporated by reference in their entireties herein.

SUMMARY

In recent years, public awareness of the unhealthy air quality in many countries has increased significantly, and air quality improvement products represent a growing need. For instance, indoor air has two major classes of contaminants: PM2.5, or small particulate matter, and VOC's, or airborne chemicals. Filtration media capable of capturing PM2.5 is highly desirable. In the meantime, shared interest in protecting the environment has heightened the importance of sustainable materials. These trends bring new challenges to air filter design.

First, for many applications such as the residential heating ventilation and cooling (HVAC) filtration, low pressure drop is required for the filter, because high pressure drop can cause airflow reduction and hinder the heating/cooling performance of the HVAC system. Secondly, the dust holding capacity is also a critical perimeter for filters. Higher dust holding capacity (DHC) allows the filter to be used for a longer time without change. since sustainable media made from bio-based materials are usually more expensive, it is necessary to reduce the material usage in a filter made of sustainable material. Thirdly, the web strength is also very critical because insufficient web strength will require additional support for the filter media, which means added manufacturing cost.

The present inventors have created a multi-layer composite with excellent dust holding performance and low pressure drop. The filter media disclosed here has utility in both a flat-web structure and as a three-dimensional (e.g., pleated) structure in a wide variety of air filtration applications, e.g., air-conditioner filters, room air purifier filters, and residential HVAC filters. The composites of the present disclosure typically include at least two nonwoven web layers, with at least one layer including multicomponent, aliphatic polyester fibers. The multicomponent fibers can include polylactic acid (PLA) and polybutylene succinate (PBS) arranged as a core/sheath bicomponent fiber, where the sheath layer can also be a blend of PLA and PBS. The first or top nonwoven web layer has a relatively high degree of bundling amongst its fibers, resulting in enhanced DHC for the web. The second nonwoven web layer can also include aliphatic polyester fibers (e.g., PLA fibers), which are typically but not exclusively monocomponent fibers. The bottom, second nonwoven web layer offers improved filtration performance and low pressure drop across the combined media and good web strength. The multi-layer composite of the present disclosure also demonstrates sufficient mechanical strength, allowing it to be used without a separate support layer, leading to a potential reduction in manufacturing cost and complexity.

In certain advantageous embodiments, the multilayer articles may be dimensionally stable and lack non-biodegradable stabilizers (e.g., polypropylene) and viscosity modifiers. This is in stark contrast to typical nonwoven webs and composites made from PLA.

In one aspect, the present disclosure provides a multi-layered composite comprising: a first layer comprising a first nonwoven web, the web including multicomponent fibers; and a second layer comprising a second nonwoven web adjacent the first layer, wherein the first nonwoven layer has a Fiber Bundling Index of at least 3.

In another aspect, the present disclosure provides a multi-layered composite comprising: a first layer comprising a first spunbonded web, the web including bicomponent fibers; and a second layer comprising a second spunbonded web affixed to the first layer, wherein the bicomponent fibers include one of a sheath comprising PBS and a core comprising PLA, and a sheath comprising PLA and a core comprising PBS, and wherein the second spunbonded web includes PLA, and wherein the composite lacks at least one of a viscosity modifier and a polypropylene stabilizing additive.

The multi-layered composites are well suited for use in both flat and pleated air filters. Such filters may have a Dust Holding Capacity (DHC) of at least 40 g/m$^2$, and a pressure drop of no greater than 0.15 mmH$_2$O.

As used herein, the term "m.p." refers to melting point or melting range as indicated.

As used herein, "Solidity" describes a dimensionless fraction (usually reported in percent) that represents the proportion of the total volume of a nonwoven web that is occupied by the solid (e.g., polymeric filament) material. Loft is 100% minus Solidity and represents the proportion of the total volume of the web that is unoccupied by solid material.

As used herein, the term "spunbonded" refers to a nonwoven web comprised of meltspun fibers, at least some of which fibers exhibit fiber-fiber bonds, e.g., as provided by autogenous bonding as described later herein.

As used herein, the term "meltspun" refers to fibers that are formed by extruding filaments out of a set of orifices and allowing the filaments to cool and solidify to form fibers, with the filaments passing through an air space (which may contain streams of moving air) to assist in cooling the filaments and passing through an attenuation (i.e., drawing) unit to at least partially draw the filaments.

As used herein, the term "Quality Factor" is a figure of merit for the overall performance of a filter media in filtering particles from air, and is defined and discussed later herein.

As used herein, the term "self-supporting" denotes a spunbonded web that exhibits sufficient mechanical integrity to be handled and subjected to conventional web handling processes (e.g., winding, unwinding, and the like).

As used herein, the term "pleated" refers to a web having at least portions of which have been folded to form a configuration comprising rows of generally parallel, oppositely oriented folds.

As used herein, the term "web" denotes a mass of nonwoven fibers that are bonded to each other sufficiently that the mass of fibers has sufficient mechanical integrity to be handled as a self-supporting layer; e.g., that can be handled with conventional roll-to-roll web-handling equipment.

As used herein, "biodegradable" refers to materials or products that meet the requirements of ASTM D6400-12 (2012), which is the standard used to establish whether materials or products satisfy the requirements for labeling as "compostable in municipal and industrial composting facilities."

As used herein, the term "melt-processable", means a polymer available as a fluid or that can be pumped or extruded at the temperatures used to process the multi-layer articles, and do not degrade or gel at those temperatures to the extent that the physical properties are so poor as to be unusable for the intended application As used herein, "layer" means a single stratum that may be continuous or discontinuous over a surface.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

As recited herein, all numbers should be considered modified by the term "about".

As used herein, "a", "an", "the", "at least one", and "one or more" are used interchangeably. Thus, for example, a core comprising "a" pattern of recesses can be interpreted as a core comprising "one or more" patterns.

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

The above summary of the present disclosure is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exhaustive list.

BRIEF DESCRIPTION OF DRAWINGS

The present disclosure will be further described with reference to the accompanying drawings, in which.

Layers in certain depicted embodiments are for illustrative purposes only and are not intended to absolutely define the thickness, relative or otherwise, or the location of any component. While the above-identified figures set forth several embodiments of the disclosure, other embodiments are also contemplated, as noted in the discussion. In all cases, this disclosure presents the disclosure by way of representation and not limitation. It should be understood that numerous other modifications and embodiments can be devised by those skilled in the art, which fall within the scope and spirit of the principles of the invention.

DETAILED DESCRIPTION

Figure 1:
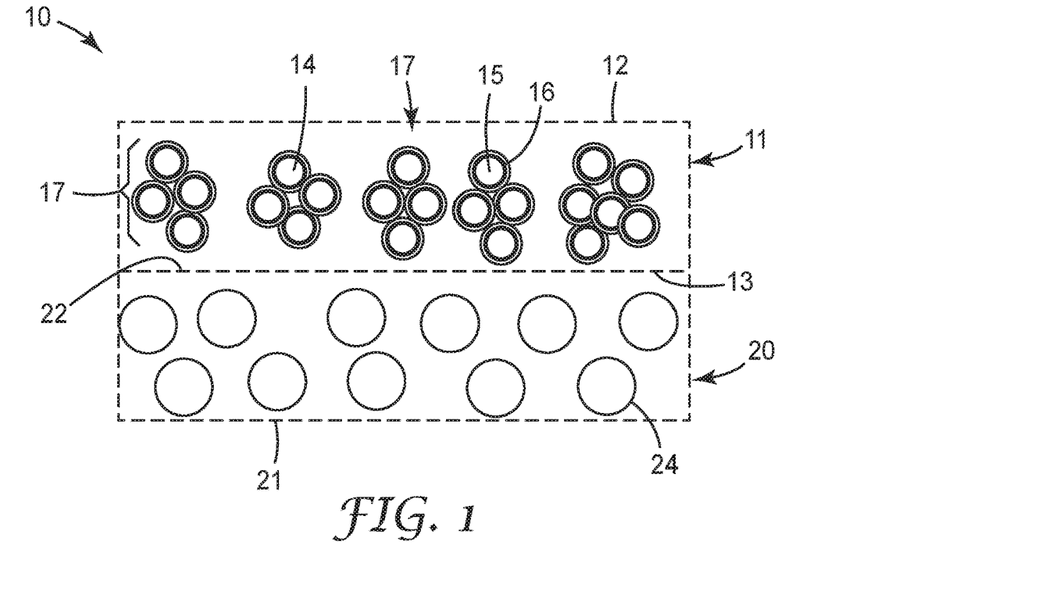
FIG. 1 is a cross-sectional illustration of a bilayer composite according to an embodiment of the present disclosure.
Figure 2:
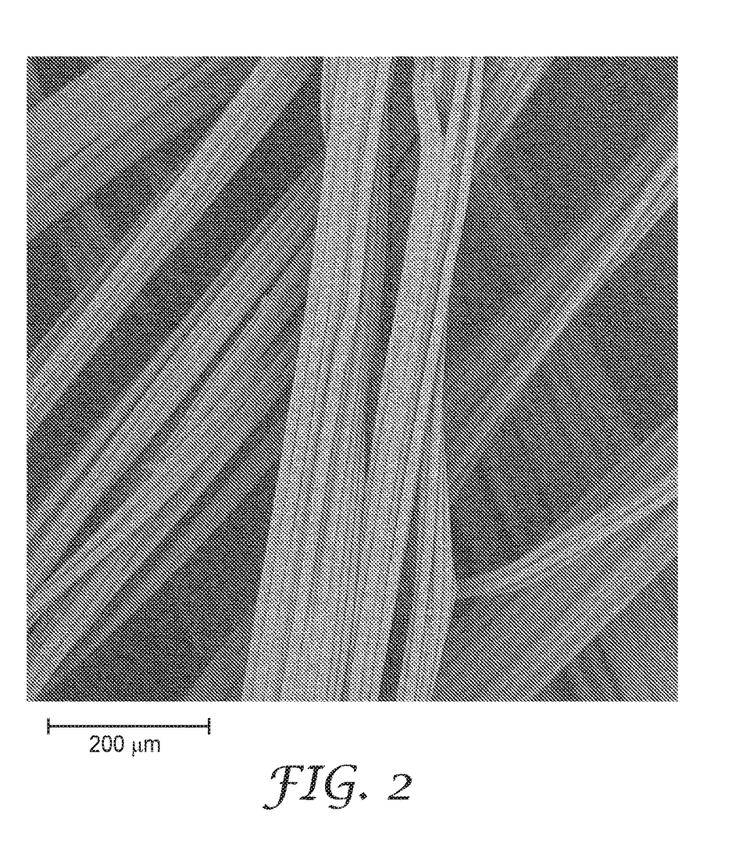
FIG. 2 is a scanning electron micrograph at 340 times magnification in top view, of a spunbonded nonwoven web as first layer of a multi-layer composite web.

Referring to FIG. 1, exemplary multi-layered composite 10 comprises first nonwoven web layer 11 having a first and second major surface 12, 13. First nonwoven web layer 11 comprises polymeric fibers 14. As depicted, the polymeric fibers 14 are bi-component fibers including a core 15 and sheath 16. The bi-component fibers 14 are arranged in macrobundles 17, in that several (e.g., four, five, or as many as eight or more) fibers which are bonded together along a segment of their length. The multi-layered composite 10 further comprises second nonwoven layer 20 having first and second major surface 21, 22. The second nonwoven layer 20 comprises monocomponent fibers 24. In other embodiments not depicted, both the first and second nonwoven webs 11, 20 may each include multi-component fibers, or both may contain monocomponent fibers. One skilled in the art will immediately recognize that the fibers 14, 24 are not drawn to scale and are not arranged in the layers 11, 20 with any particular purpose other than for ease of illustration.

The first and second nonwoven layers can be made by techniques known in the art. Each may be made using the same or similar technique, or the layers may be created using disparate techniques and coupled together in a post-processing step. The nonwoven webs may be made, for example, by conventional air laid, carded, stitch bonded, spun bonded, spun-laced, wet laid, and/or melt blown procedures. "Melt-blowing", as used herein, means a method for forming a nonwoven fibrous web by extruding a molten fiber-forming material through a plurality of orifices in a die to form fibers while contacting the fibers with air or other attenuating fluid to attenuate the fibers into fibers, and thereafter collecting the attenuated fibers. An exemplary meltblowing process is taught in, for example, U.S. Pat. No. 6,607,624 (Berrigan et al.). "Meltblown fibers" means fibers prepared by a melt-blowing or meltblown process. "Spun-bonding" and "spun bond process" mean a method for forming a nonwoven fibrous web by extruding molten fiber-forming material as continuous or semi-continuous fibers from a plurality of fine capillaries of a spinneret, and thereafter collecting the attenuated fibers. An exemplary spun-bonding process is disclosed in, for example, U.S. Pat. No. 3,802,817 (Matsuki et al.). "Spun bond fibers" and "spun-bonded fibers" mean fibers made using spun-bonding or a spun bond process. Such fibers are generally continuous fibers and are entangled or point bonded sufficiently to form a cohesive nonwoven fibrous web such that it is usually not possible to remove one complete spun bond fiber from a mass of such fibers. The fibers may also have shapes such as those described, for example, in U.S. Pat. No. 5,277,976 (Hogle et al.), which describes fibers with unconventional shapes. Meltspun fibers can also be distinguished from staple fibers, which are typically cut to a desired length, in contrast to meltspun fibers which are typically continuous except for occasional, statistically-occurring fiber breaks. Meltspun fibers and spunbonded webs can also be distinguished from, e.g., carded webs (which typically exhibit a noticeable fiber alignment imparted by the carding process, that is not present in spunbonded webs), and also airlaid webs, wetlaid webs, and so on. "Carding" and "carding process" mean a method of forming a nonwoven fibrous web webs by processing staple fibers through a combing or carding unit, which separates or breaks apart and aligns the staple fibers in the machine direction to form a generally machine direction oriented fibrous nonwoven web. Exemplary carding processes and carding machines are taught in, for example, U.S. Pat. No. 5,114,787 (Chaplin et al.) and U.S. Pat. No. 5,643,397 (Gorman et al.). "Bonded carded web" refers to nonwoven fibrous web formed by a carding process wherein at least a portion of the fibers are bonded together by methods that include for example, thermal point bonding, autogenous bonding, hot air bonding, ultrasonic bonding, needle punching, calendering, application of a spray adhesive, and the like. Further details regarding the production and characteristics of nonwoven webs and laminates including nonwoven webs may be found, for example, in U.S. Pat. No. 9,469,091 (Henke et al.), which is incorporated by reference in its entirety herein. "Air-laying" refers to a process in which bundles of small fibers having typical lengths ranging from about 3 to about 52 millimeters (mm) are separated and entrained in an air supply and then deposited onto a forming screen, usually with the assistance of a vacuum supply. The randomly oriented fibers may then be bonded to one another using, for example, thermal point bonding, autogenous bonding, hot air bonding, needle punching, calendering, a spray adhesive, and the like. An exemplary air-laying process is taught in, for example, U.S. Pat. No. 4,640,810 (Laursen et al.). "Wet-laying" refers to a is a process in which bundles of small fibers having typical lengths ranging from about 3 to about 52 millimeters (mm) are separated and entrained in a liquid supply and then deposited onto a forming screen, usually with the assistance of a vacuum supply. Water is typically the preferred liquid. The randomly deposited fibers may by further entangled (e.g., hydro-entangled), or may be bonded to one another using, for example, thermal point bonding, autogeneous bonding, hot air bonding, ultrasonic bonding, needle punching, calendering, application of a spray adhesive, and the like. An exemplary wet-laying and bonding process is taught in, for example, U.S. Pat. No. 5,167,765 (Nielsen et al). Exemplary bonding processes are also disclosed in, for example, U.S. Pat. No. 9,139,940 (Berrigan et al).

In presently preferred implementations, at least the first nonwoven layer comprises a spunbonded web. At least some, or all, of the fibers in the first nonwoven layer may be multicomponent fibers comprising at least two phases of differing organic polymeric compositions. Such fibers may have any suitable configuration, chosen from, e.g., sheath-core, side-by-side, islands-in-the-sea, and so on. In some embodiments, such fibers may include at least one organic polymeric phase with a composition that promotes or enhances bonding, e.g., melt-bonding, of the fibers to each other. Multicomponent fibers can be advantageous in the first layer in that they can provide different properties to different portions of individual fibers (e.g., a different melt temperature for the core as compared to the sheath), and can contribute to high dust holding through macrobundling, as described in further detail below. Multicomponent fibers may suitably include various additives, e.g., one or more of antioxidants, plasticizers, processing aids, and so on, may be present for any desired purpose. In particular embodiments, the fibers may include a charging additive for the purpose of allowing a stable electric charge (an "electret") to be imparted to the fiber. Suitable charging additives are explored in U.S. Pat. No. 10,273,612 (Song et al.).

In certain embodiments, the first spunbonded web includes a thermoplastic aliphatic polyester. In certain exemplary embodiments, the aliphatic polyester is semicrystalline. The molecular weight of the thermoplastic polymer(s) is typically chosen so that the polymer is melt-processable. For polylactide, for example, the molecular weight may be from about 10,000 to 1,000,000 daltons and is preferably from about 30,000 to 300,000 daltons.

In certain embodiments, the thermoplastic aliphatic polyesters of the first fibrous web are biodegradable and selected from a group including a poly(lactic acid) (PLA), a poly (glycolic acid), a poly(lactic-co-glycolic acid), a polyalkylene succinate such as polybutylene succinate (PBS), a polyalkylene adipate, a polyhydroxybutyrate (PHB), a polyhydroxy valerate (PHV), polyhydroxyhexanoate (PHH), polyhydroxybutyrate-hydroxyvalerate copolymers (PHBV), and combinations thereof. In further embodiments, the fibers comprise at least one of naturally occurring zein, polycaprolactone, cellulosic ester and combinations thereof. In alternative embodiments that are not necessarily biodegradable, the fibers may comprise dimer acid polyamide or polyolefin (e.g., polypropylene).

Blends may be made using a variety of other polymers including aromatic polyesters, aliphatic/aromatic copolyesters such as those described in U.S. Pat. No. 7,241,838, cellulose esters, cellulose ethers, thermoplastic starches, ethylene vinyl acetate, polyvinyl alcohol, ethylenevinyl alcohol, and the like. In blended compositions which include thermoplastic polymers which are not aliphatic polyesters, the aliphatic polyester is typically present at a concentration of greater than 70% by weight of total thermoplastic polymer, preferably greater than 80% by weight of total thermoplastic polymer and most preferably greater than about 90% by weight of thermoplastic polymer.

A PLA polymer or copolymer (e.g., a melt-processable material, in particular a fiber-forming resin) contains lactic acid monomer (repeat) units. Such polymers or copolymers may generally be derived from monomers chosen from any isomer of lactic acid, such as L-lactic acid, D-lactic acid, or mixtures thereof. Polylactic acid may also be formed from anhydrides of any isomer of lactic acid, including L-lactide, D-lactide, meso-lactide, or mixtures thereof. Cyclic dimers of such lactic acids and/or lactides may also be employed. Thus, for example, an L-lactic acid monomer unit of a polylactic acid will be understood as being derivable from an L-lactic acid monomer or from any source that provides an equivalent monomer unit in the thus-formed polymer. Any known polymerization method, such as polycondensation or ring-opening polymerization, may be used to produce such polymers.

A polylactic acid may be an L-lactic acid or D-lactic acid homopolymer; or, it may be a copolymer, such as one that contains L-lactic acid monomer units and D-lactic acid monomer units. (In such polymers, a homopolymer or copolymer designation will be a "stereo" designation based on the tacticity of the monomer units rather than on the chemical composition.) Again, such monomer units may be derived from the incorporation into the copolymer chain of L-lactic acid, D-lactic acid, L-lactide, D-lactide, meso-lactide, and so on. In some embodiments, a polylactic acid may be an L-D copolymer comprised predominately of L-lactic acid monomer units along with a small amount of D-lactic acid monomer units (which may, e.g., improve the melt-processability of the polymer).

In some embodiments, at least some polylactic acid that is present in the meltspun fibers may be a (compositional) copolymer that comprises one or more additional (non-lactic acid) monomer units. Such monomer units might include, e.g., glycolic acid, hydroxypropionic acid, hydroxybutryic acid, and the like. In various embodiments, lactic acid monomer units (whether L or D, and being derived from whatever source) may make up at least about 60, 70, 80, 85, 90, 95, or 99.5 weight % of the meltspun polylactic acid fibers.

In certain presently preferred implementations, the first nonwoven web layer includes bi-component fibers comprising a core material covered with a sheath wherein the sheath material (with a lower melting point) melts to bind with other fibers but the core material (with a higher melting point) maintains its shape. This combination of component fibers with disparate melting points may also be useful for other multicomponent fiber arrangements, such as side-by-side, islands-in-the-sea, etc. Typically, the melting point of the first component polymer of a multicomponent fiber (e.g., the core) is from about 160° C. to about 250° C., in some embodiments from about 170° C. to about 240° C., and in some embodiments, from about 180° C. to about 220° C. Typically, the melting point of the second, low melting point component can be from about 50° C. to about 160° C., in some embodiments from about 100° C. to about 160° C., and in some embodiments, from about 120° C. to about 160° C. Moreover, the melting point of the second component is also typically at least about 20° C., in some embodiments at least about 30° C., and in some embodiments, at least about 40° C. less than the melting point of the high melting point, first component.

Various aliphatic polyesters may be employed as the high melting point component in the first nonwoven web of the present disclosure, such as polyesteramides, modified polyethylene terephthalate, PLA, polyglycolic acid, polyalkylene carbonates (such as polyethylene carbonate), PHA, PHB, PHV, and PHBV. The second component of the multicomponent fiber (e.g., the sheath) may be formed from one or more low melting point aliphatic polyesters. Low melting point aliphatic polyesters are useful in that they biodegrade at a faster rate than the high melting point polyesters. The glass transition temperature ("$T_g$") of the low melting point polyesters may also be less than that of the high melting point polyesters to improve flexibility and processability of the polymers. For example, the low melting point aliphatic polyesters may have a $T_g$ of about 25° C. or less, in some embodiments about 0° C. or less, and in some embodiments, about −10° C. or less. Such a glass transition temperature may be at least about 5° C., in some embodiments at least about 10° C., and in some embodiments, at least about 15° C. less than the glass transition temperature of the high melting point polyesters.

Examples of aliphatic polyesters that may have a suitably low melting point and glass transition temperature include aliphatic polyesters with repeating units of at least 5 carbon atoms (e.g., polyhydroxyvalerate, polyhydroxybutyrate-hydroxyvalerate copolymer and polycaprolactone), succinate-based aliphatic polymers (e.g., PBS). More specific examples may include polyethylene oxalate, polyethylene malonate, polyethylene succinate, polypropylene oxalate, polypropylene malonate, polypropylene succinate, polybutylene oxalate, polybutylene malonate, PBS, and blends and copolymers of these compounds.

The multicomponent fibers of the type described herein may be prepared with or without nucleating agents. One type of such a nucleating agent is a multi-carboxylic acid, such as succinic acid, glutaric acid, adipic acid, pimelic acid, suberic acid, azelaic acid, sebacic acid, and mixtures of such acids, as described in U.S. Pat. No. 6,177,193 (Tsai, et al). Preparation of multicomponent fibers in the absence of nucleating agents is exemplified in U.S. Pat. No. 7,972,692 (Chakravarty et al.). Other materials that may be used in the preparation of multicomponent fibers include without limitation, pigments, antioxidants, wetting agents, stabilizers, surfactants, waxes, flow promoters, solid solvents, plasticizers, particulates, and other materials added to enhance the processability of the thermoplastic composition. Multicomponent fibers suitable for use in the multi-layered composites of the present invention are exemplified in U.S. Pat. No. 6,953,622 (Tsai et al.), U.S. Pat. No. 7,972,692 (Chakravarty et al.), U.S. Pat. No. 7,238,634 (Bansal et al.), U.S. Pat. No. 6,953,622 (Tsai et al.), U.S. Pat. No. 8,518,311 (He et al.), U.S. Pat. No. 9,487,893 (Moore et al.), and U.S. Pat. No. 10,273,612 (Song et al.).

The relative amount of the high melting point and low melting point components may generally vary based on the desired properties. For example, the first high melting point component may constitute from about 5 wt. % to about 95 wt. %, in some embodiments from about 10 wt. % to about 90 wt. %, and in some embodiments, from about 15 wt. % to about 85 wt. % of the total weight of the multicomponent fibers. Likewise, the second, low melting point component may constitute from about 5 wt. % to about 95 wt. %, in some embodiments from about 10 wt. % to about 90 wt. %, and in some embodiments, from about 15 wt. % to about 85 wt. % of the total weight of the multicomponent fibers.

In a presently preferred working example, the first nonwoven web includes a PLA core and a PBS/PLA sheath, with the PLA core constituting between about 65 to 95 wt % and the PBS/PLA sheath constituting between about 5 to 35 wt. %. A particularly viable spunbonded web includes bicomponent fibers having 30 wt. % PBS sheath and 70 wt. % PLA core.

Useful nonwoven webs may have any suitable Effective Fiber Diameter, basis weight or thickness that is desired for an application, e.g., air filtration. "Effective Fiber Diameter" or "EFD" is the apparent diameter of the fibers in a fiber web based on an air permeation test in which air at 1 atmosphere and room temperature is passed through a web sample at a specified thickness and face velocity (typically 5.3 cm/sec), and the corresponding pressure drop is measured. Based on the measured pressure drop, the Effective Fiber Diameter is calculated as set forth in Davies, C. N., The Separation of Airborne Dust and Particulates, Institution of Mechanical Engineers, London Proceedings, IB (1952). The fibers of the first nonwoven web layer typically have an effective fiber diameter of from at least 20, 25, 30, or 40 micrometers and at most 125, 100, 90, 80, 75, or 50 micrometers. The nonwoven backing typically has a basis weight in the range of at least 5, 10, 20, or even 50 g/m$^2$; and at most 800, 600, 400, 200, or even 100 g/m$^2$. Basis weight can be calculated from the weight of a 10 cm×10 cm sample and is typically in the range from about 20 g/m$^2$ to 100 g/m$^2$ for the first nonwoven web layer.

In some embodiments, the first nonwoven web layer may be a high-loft spunbonded web. As used herein, this signifies a web that exhibits a Solidity of less than 10.0%. Solidity is determined by dividing the measured bulk density of a nonwoven fibrous web by the density of the materials making up the solid portion of the web. Bulk density of a web can be determined by first measuring the weight (e.g., of a 10-cm-by-10-cm section) of a web. Dividing the measured weight of the web by the web area provides the basis weight of the web, which is reported in g/m2. The thickness of the web can be measured by obtaining (e.g., by die cutting) a 135 mm diameter disk of the web and measuring the web thickness with a 230 g weight of 100 mm diameter centered atop the web. The bulk density of the web is determined by dividing the basis weight of the web by the thickness of the web and is reported as g/m3. The Solidity is then determined by dividing the bulk density of the nonwoven fibrous web by the density of the material (e.g., polymer) comprising the solid filaments of the web. The density of a bulk polymer can be measured by standard means if the supplier does not specify the material density.

Loft is usually reported as 100% minus the Solidity (e.g., a Solidity of 7% equates to a loft of 93%). A higher loft is particularly advantageous in air filtration applications, as the higher loft can contribute to enhanced dust holding capabilities, as shown in the Examples below.

As disclosed herein, webs of Solidity from about 2.0% to less than 12.0% (i.e., of loft of from about 98.0% to greater than 88.0%) can be produced. In various embodiments, webs as disclosed herein comprise a Solidity of at most about 7.5%, at most about 7.0%, or at most about 6.5%. In further embodiments, webs as disclosed herein comprise a Solidity of at least about 5.0%, at least about 5.5%, or at least about 6.0%.

Without wishing to be bound by theory, the inventors postulate that the performance advantages disclosed herein may result at least in part from the use of multicomponent aliphatic polyesters that bond together in the spunbonding process. That is, a relatively high number of ropy aggregated bundles (often called "macrobundles") comprising several (e.g., four, five, or as many as eight or more) fibers which are bonded together along a segment of their length (such fibers are occasionally called "married" fibers) may be advantageously formed. While such macrobundles may be present to some extent in any spunbonded web, the inventors postulate that an increased amount and size of macrobundles may be at least partially responsible for the desirable dust holding properties of the first nonwoven web layer.

The degree of macrobundling in spunbonded nonwoven webs is characterized as a Fiber Bundling Index, defined by comparing the Actual Fiber Diameter (AFD) of the fibers of the web to the Effective Fiber Diameter (EFD) exhibited by the web.

$$\text{Fiber Bundling Index} = \frac{\text{Effective Fiber Diamer}}{\text{Actual Fiber Diameter}} \quad \text{Equation 1}$$

As explained in detail in the Examples section, the Actual Fiber Diameter is obtained by microscopic observation and represents the (average) actual physical diameter of the fibers. The inventors have found that spunbonded webs as disclosed herein unexpectedly exhibit an Effective Fiber Diameter which is at least about 100% greater than the Actual Fiber Diameter of the web, as seen in Table 3 of the Examples section. For example, Example 1 displays an Effective Fiber Diameter (52 µm) that is around 350% greater than the Actual Fiber Diameter (15 µm) of the web (that is, the Fiber Bundling Index is approximately 3.51). In contrast, the web of Comparative Example 1 displays an Effective Fiber Diameter (29.0 µm) that is less than 30% greater than the Actual Fiber Diameter (22.6 µm) of the web of Comparative Example 1.

Those of ordinary skill in the art will appreciate that the increase in the Fiber Bundling Index of Example 1 versus that of the web of Comparative Example 1, occurs despite the fact that both webs display quite similar Actual Fiber Diameters (15 µm versus 16 µm).

In various embodiments, spunbonded webs useful in the first nonwoven web layer comprise a Fiber Bundling Index of at least about 2.0, at least about 2.5, at least about 3.0 or at least about 4.0. Spunbonded webs useful in the first nonwoven web layer comprise a Fiber Bundling Index of no greater than about 10.0, no greater than about 9.5, or no greater than about 8.0. The degree of bundling is considerably greater for the first nonwoven layer of the present multi-layered composites than is typically advised for spunbonded webs. The macrobundling, and attendant increase in loft, leads to potentially exceptional dust holding capacity (DHC) for the multi-layered composites of the present disclosure.

As noted above, at least some, or all, of the fibers in the second nonwoven web can be monocomponent fibers. The term "monocomponent" refers to the polymeric material of a fiber and denotes a fiber in which a continuous phase of uniform polymeric composition extends across the cross-section and over the length of the fiber. In some convenient embodiments, a monocomponent fiber may be an aliphatic polyester fiber, such as PLA. The term monocomponent does not necessitate that the polymeric component material is the only component of the fiber. Rather, in various embodiments, any suitable additive, such as those described above, may be present for any desired purpose.

In other embodiments, the fibers in the second nonwoven web are multicomponent fibers of the same or different composition as the fibers in the first nonwoven web layer. The considerations of multicomponent fibers of the first web above apply equally to the second nonwoven web. In various embodiments, nonwoven webs useful in the second nonwoven web layer also comprise a Fiber Bundling Index of at least about 2.0. In a presently preferred working example, the second nonwoven web includes a PLA core and a PBS/PLA sheath, with the PLA core constituting between about 65 to 95 wt % and the PBS/PLA sheath constituting between about 5 to 35 wt. %. A particularly viable spunbonded web includes bicomponent fibers having 30 wt. % PBS sheath and 70 wt. % PLA core.

The fibers of the second nonwoven web typically have an EFD of from at least 0.1, 1, 2, or even 4 micrometers and at most 125, 75, 50, 35, 25, 20, 15, or 10 micrometers, with a typical range between 2 and 40 micrometers. The second nonwoven web layer preferably has a basis weight in the range of at least 5, 10, 20, or even 50 g/m$^2$; and at most 800, 600, 400, 200, or even 100 g/m$^2$, with a typical range between 20 and 100 g/m$^2$.

The second nonwoven web may include fibers of the same material type as the first nonwoven web, including thermoplastic aliphatic polyesters. The second nonwoven web may include fibers made from a blend of thermoplastic materials, including blends made exclusively from biodegradable materials. Typically, the fibers of the second nonwoven web in monocomponent embodiments are comprised primarily of PLA, that is the PLA constitutes at least about 60 wt. %, in some embodiments at least about 80 wt. %, and in some embodiments, at least about 90 wt. % of the blend. In a presently preferred example, the second nonwoven web includes blended fibers of 80% by weight PLA and 20% by weight PBS, based on the total weight of the composition.

As referenced above, the second nonwoven web layer is presently preferred to be spunbonded web, particularly when the first nonwoven web layer is also spunbonded web; other nonwoven webs (e.g., meltblown or airlaid) may be used in other alternative embodiments.

It is believed that web composites made according to the present disclosure may be dimensionally stable without the use of polypropylene as a stabilizing agent. Polypropylene, while leading to improved stability for certain blown and meltspun webs, is not properly biodegradable and adds cost to the manufacturing process. "Dimensionally stable" refers to webs having at least one dimension which decreases by no greater than 10% in the plane of the web, when the web is heated to a temperature above a glass transition temperature of the fibers. In the plane of the web refers to the x-y plane of the web, which may also be referred to as the machine direction and/or cross direction of the web. Thus, the multilayered composites described herein can be have at least one dimension in the plane of the web, e.g., the machine or the cross direction, that decreases by no greater than 10%, when the web is heated to a temperature above a glass transition temperature of the fibers. In other circumstances where biodegradability poses less of a requirement or concern, fibers may be blended polypropylene in an amount greater than 0% and no more than 10% by weight of the web, before or during extrusion, as described in U.S. Pat. No. 9,487,893 (Moore et al.).

Various other optional conventional treatments and additives may be used in conjunction with the nonwoven fiber web such as, for example, application of antistatic agents, lubricants, or corona treatment.

Air Filters

Multi-layer composites of the present disclosure may be formed into, or be incorporated into, any desired article, e.g., for purposes of filtration and the like. For such purposes, the composite 10 may be conveyed to any desired apparatus such as one or more embossing stations, laminators, cutters and the like. If desired, one or more secondary bonding operations (in addition to the autogenous bonding) may be performed. Any such operation may be done in-line with the web-producing operation; or the web may be wound into a storage roll until such time as it is desired to be further processed. Additional layers, for example supporting layers, pre-filter layers, and the like, may be combined (e.g., by lamination) with the webs disclosed herein. Thus, in some embodiments the multi-layer articles may be provided as one or more of sublayers in a multilayer article. The multi-layer webs of the present disclosure possess sufficient strength, however, that support layers are not strictly necessary for use of the web for air filtration.

Figure 3:
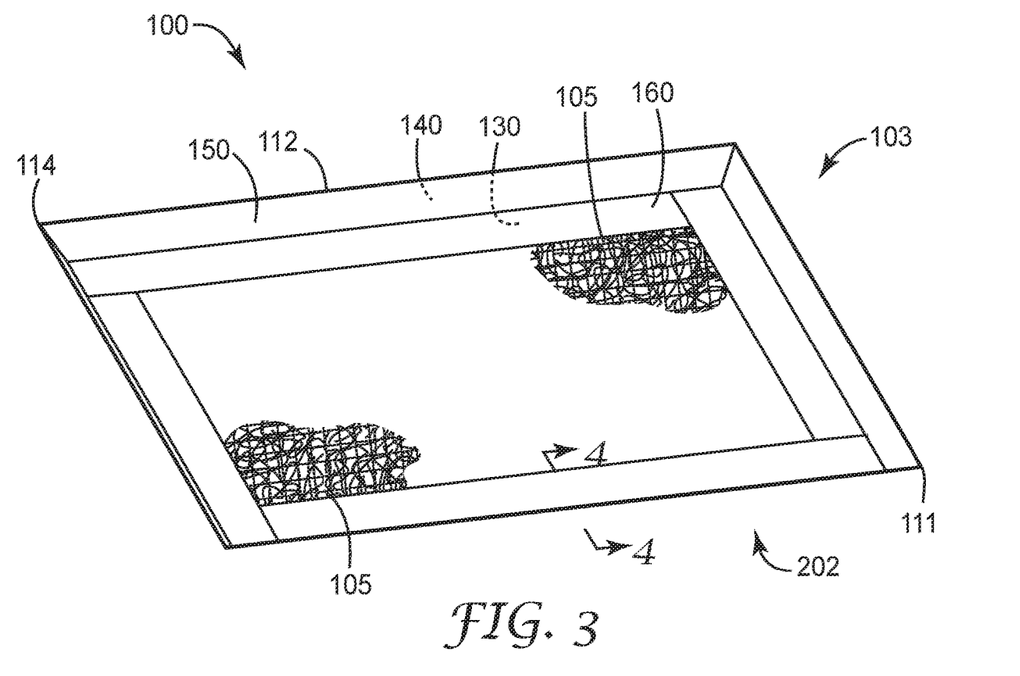
FIG. 3 is a perspective view of a flat panel filter according to an embodiment of the present disclosure.
Figure 4:
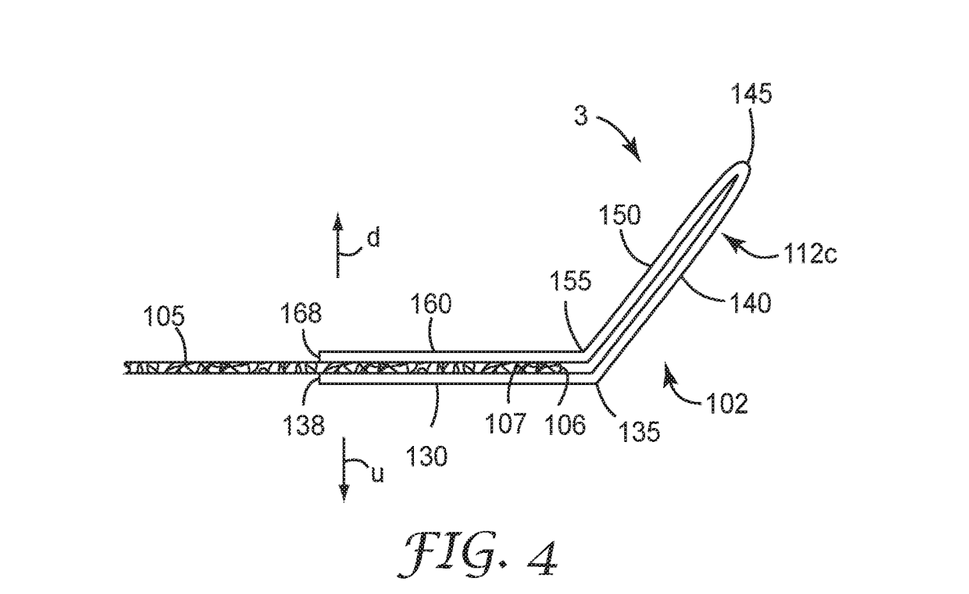
FIG. 4 is a cross-sectional slice view of a portion of the exemplary framed air filter of FIG. 3, taken along line 4-4.

In some embodiments, the multi-layer webs as disclosed herein may be used for filtration, e.g., air filtration, in flat (unpleated) form. An exemplary flat panel filter is depicted in FIG. 3 in perspective view from and shown in FIG. 4 is a cross-sectional slice view of a portion of the exemplary flat panel filter of FIG. 3. Filter 100 comprises an upstream side 102 and a downstream side 103 and comprises air filter media 105 and frame 112 mounted generally on, and surrounding, perimeter 106 of filter media 105 (here, multi-layer webs of the present disclosure). Flat panel air filter 100 may be rectangular in shape (which specifically includes square shapes) with corners 144, with filter media 105 thus having a generally rectangular perimeter 106. Frame 112 may thus take the form of a rectangular frame with four major elongate frame portions that are each mounted on one of the four major edges of the filter media and with neighboring frame portions meeting to form corners 111 of frame 112 as shown in FIG. 3.

As shown in FIG. 4, at least one portion of frame 112 comprises a downstream flange 160 and an upstream flange 130, which flanges may be generally parallel to each other and may capture (e.g., pinch) border portion 107 of filter media 105 therebetween. The frame portion further comprises outer sidewall 140, which extends outward and downstream from flange 130 and is foldably connected thereto by fold line 135; and, inner sidewall 150, which extends outward and downstream from flange 160 and is foldably connected thereto by fold line 155, with outer sidewall 140 and inner sidewall 150 being foldably connected by fold line 145.

In various embodiments, inner sidewall 150 and outer sidewall 140 may be positioned at an angle to each other (when viewed in cross section as shown in FIG. 4, and as measured from the vertex provided by fold line 145) of less than about 40, 30, 20, or 10 degrees. In further embodiments, inner sidewall 150 and outer sidewall 140 may be generally parallel to each other. In specific embodiments, areas of inner sidewall 150 and outer sidewall 140 may be bonded, e.g., adhesively bonded, to each other. Further considerations and details relating to flat panel filters may be found, for example, in U.S. Pat. No. 8,702,829 (Lise et al.).

In other embodiments, multi-layer articles as disclosed herein may be pleated to form a pleated filter. Pleated filters as described herein may be self-supporting, meaning that they do not collapse or bow excessively when subjected to the air pressure typically encountered in forced air ventilation systems. As noted earlier, in some embodiments a multi-layered composite may be pleated. Thus as shown in exemplary embodiment in FIG. 5, a multi-layered composite may provide, or be a layer of, an air filter media 200 that is pleated to comprise pleats 201 and pleat tips 202. The pleating of an air-filtration media typically serves to increase the total surface area of the media that is available within a nominal (plane-projected) area; pleating typically does not significantly change inherent properties of the media such as, e.g., loft and Percent Penetration of particles.

The pleat height and pleat spacing of the pleated web may be in any suitable range. Pleat height (pleat amplitude) is the distance from upstream tip to downstream tip, along a direction that is orthogonal to the overall major plane of the pleated web. Pleat spacing is the distance between nearest-neighbor same-side pleat tips, along a direction that is in the major plane of the filter media. The pleats may have any desired radius of curvature; for example, they may be relatively sinusoidal in appearance or they may be relatively sharp-tipped.

Figure 5:
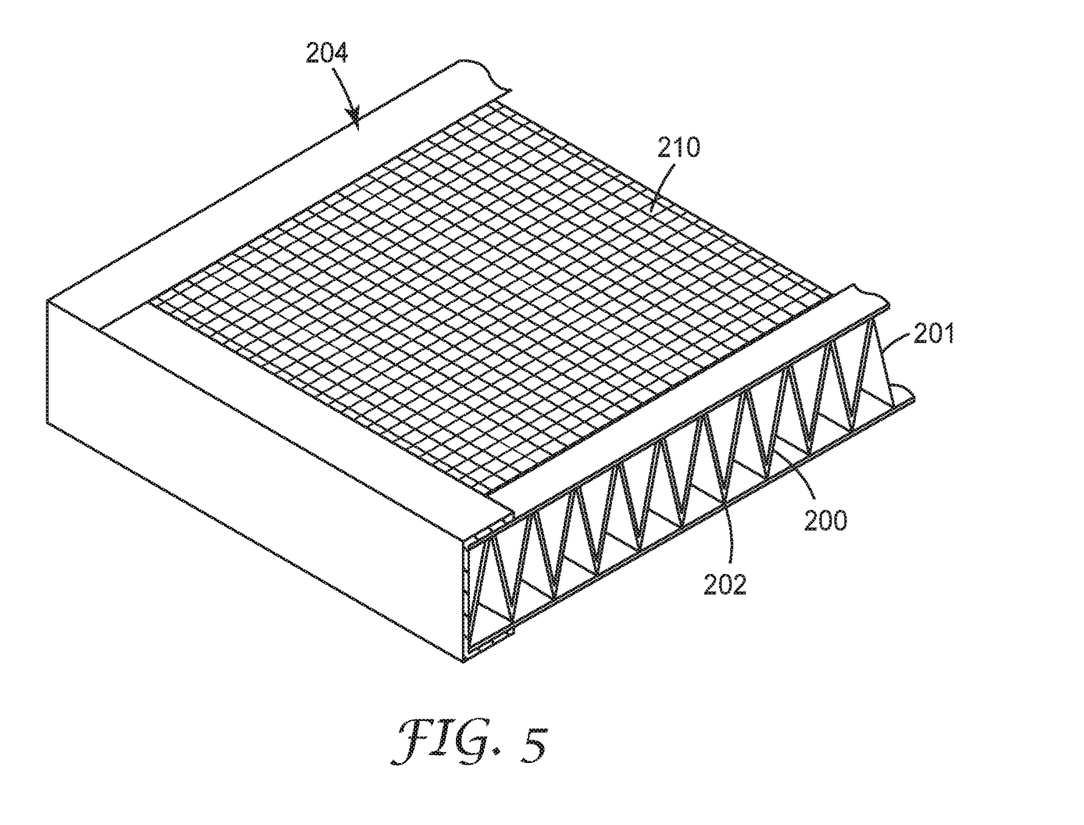
FIG. 5 is a perspective view of an air filter including pleated filter media according to another embodiment of the present disclosure.

If desired, a pleated air filter media 200 (whether in the form of a multi-layered composite alone, or in the form of a multilayer structure of which composite is a filtration layer), may be stabilized in any suitable manner. For example, in some embodiments an air filter media may be equipped with any suitable pleat-stabilizing item or items. In general, such items may take the form of members, strips, filaments, a collection of filaments, a perforated cardboard sheet, and so on. Such pleat-stabilizing items may be in contact with (e.g., bonded to) only the tips of the pleats (as with exemplary supporting scrim 210 as shown in FIG. 5); or, they may at least partially follow the pleats of the media and thus may be bonded to pleat walls and/or valleys as well. Pleat-stabilizing items of the former type might include, e.g., paperboard strips, polymeric strands, and so on. Pleat-stabilizing items of the latter type might include, e.g., wire meshes or chicken-wire type metal grids (e.g., that are applied to the filter media and then pleated along therewith), beads of drizzle glue that are applied to the pleated media, filaments that are extruded onto the surface of the media prior to being pleated, and so on.

In some embodiments, the pleated media may be provided with bridging filaments that are bonded to pleat tips of a major side of the pleated media so as to be in discontinuous or continuous contact with the media. In some embodiments, the bridging filaments may be of the general type described in PCT Patent Application Publication WO 2017/213926 (Gregerson et al.).

If desired, a perimeter support frame 204 may be mounted on the major edges of an air filter media 1 (e.g., a pleated air filter media 1) that comprises a multi-layered composite 10, e.g., as shown in exemplary manner in FIG. 5. In FIG. 5 a portion of frame 204 has been omitted in order to show pleats 201; also, it is emphasized that FIG. 5 is an exemplary representation and that specific features of media 200 (e.g., the shape of pleat tips 202) may vary from that depicted. The frame, as well as the supporting elements, may all be made from biodegradable materials.

Multi-layered composites as described herein can exhibit advantageous filtration properties, for example high filtration efficiency in combination with low pressure drop and high dust holding capacity. Such properties may be characterized by any of the well-known parameters including percent penetration, pressure drop, Quality Factor, capture efficiency (e.g., Minimum Composite Efficiency, Minimum Efficiency Reporting Value), dust holding capacity (DHC) and the like. In various embodiments, a multi-layered composite may exhibit a Dust Holding Capacity of at least 30, 40, 50 or 60 grams per square meter. In various embodiments, a multi-layered composite may exhibit a pressure drop of no greater than 0.1, no greater than 0.2, and no greater than 0.3 mm $H_2O$.

Methods of Making

Figure 6:
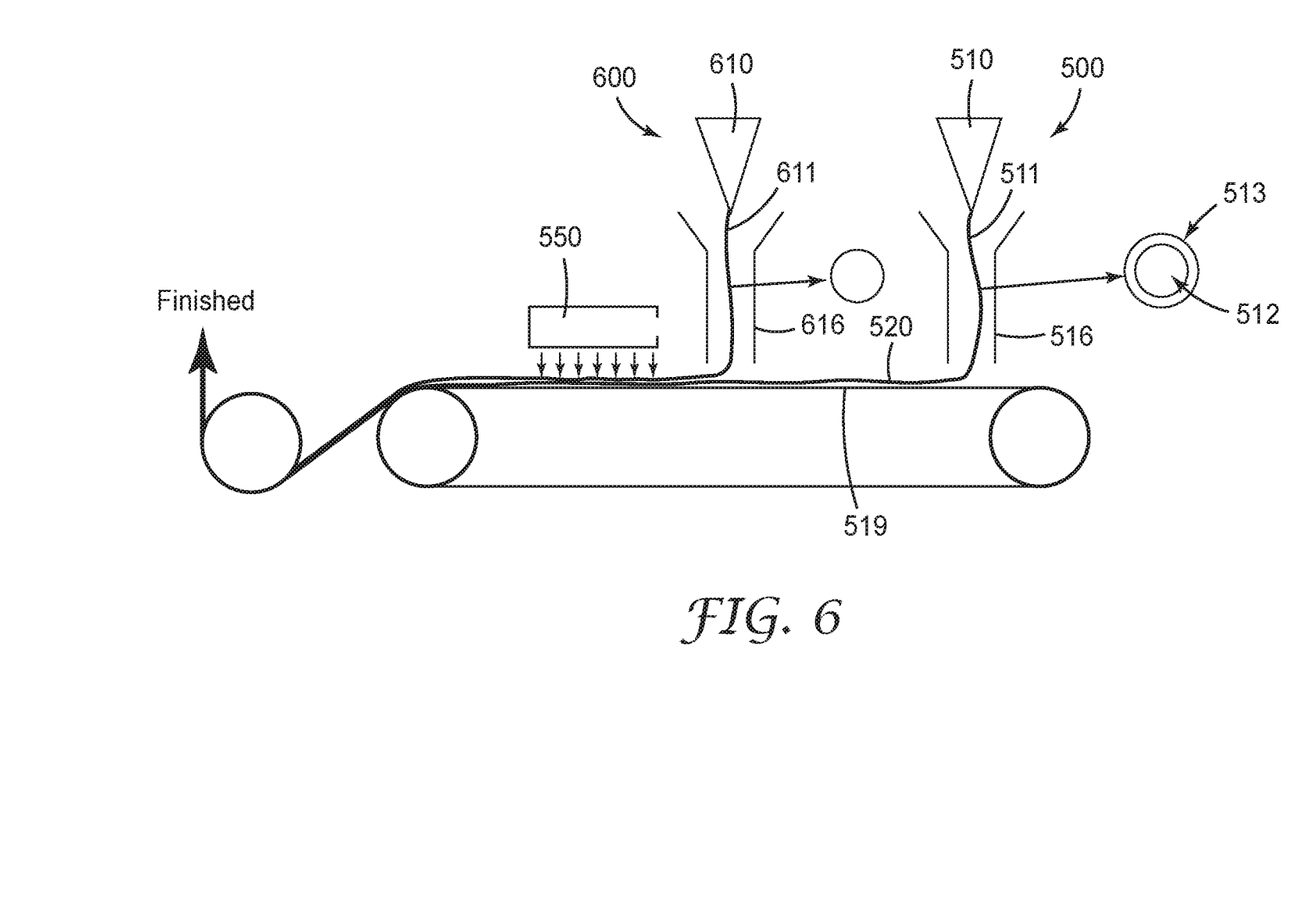
FIG. 6 is a schematic diagram of an apparatus which may be used to form a multi-layered composite web as disclosed herein.

FIG. 6 shows an exemplary apparatus which may be used to form a multi-layered composite including at least two spunbonded webs. The apparatus includes a first station 500 and a second station 600, with the first station 500 used to create the first nonwoven layer and the second station 600 used to create the second nonwoven layer. Each station 500, 600 includes at least an extrusion head 515, 615, an attenuator 516, 616, and a quenching stream (not shown), with both stations 500, 600 sharing a collector surface 519. The first station 500 is positioned upstream from the second station 600, resulting in filaments produced at the first station 500 reaching the collector surface 519 first and forming a first mass of fibers 520 on the collector surface 519. Filaments from the second station 600 are thus deposited on the surface of the first fiber mass 520 and form a second mass of fibers 620 thereon.

In an exemplary method of using such an apparatus, polymeric fiber-forming material is melted in an extruder and pumped into an extrusion head 510, 610. Extrusion head 510, 610 may be a conventional spinnerette or spin pack, generally including multiple orifices arranged in a regular pattern, e.g., straightline rows. Filaments 511, 611 of fiber-forming liquid are extruded from the extrusion head 510, 610 and may be conveyed through air-filled space to an attenuator 516, 616. Filaments 511 are deliberately depicted as bicomponent with a core 512 and a sheath 513, while filaments 611 are monocomponent. The distance the extruded filaments 511, 611 travel through air space before reaching the attenuator 516, 616 can vary, as can the conditions to which they are exposed. One or more quenching streams of air or other gas may be directed toward extruded filaments 511, 611 to reduce the temperature of, and/or to partially solidify, the extruded filaments 511, 611. Further details of attenuator 516, 616 and possible variations thereof are found in U.S. Pat. No. 6,607,624 (Berrigan et al.), U.S. Pat. No. 6,916,752 (Berrigan et al.), and U.S. Pat. No. 8,240,484 (Fox et al.), and U.S. Pat. No. 9,139,940 (Berrigan et al.).

The filaments 511 may pass through the attenuator 516 and then be deposited onto a generally flat collector surface 519 where they are collected as a first mass of fibers 520. The filaments 611 passing through the attenuator 616 are deposited onto the surface of the first fiber mass 520 (or a web, if the first fiber mass is subjected to fiber-fiber bonding upstream of the second station).

Collector surface 519 may comprise a single, continuous collector surface such as provided by a continuous belt or a drum or roll with a radius of at least six inches. Collector 519 may be generally porous and gas-withdrawal (vacuum) device can be positioned below the collector to assist deposition of fibers onto the collector (porosity, e.g., relatively small-scale porosity, of the collector does not change the fact that the collector is generally flat as defined above). The distance between the attenuator exit and the collector may be varied to obtain different effects. Also, prior to collection, extruded filaments may be subjected to a number of additional processing steps not illustrated in FIG. 1, e.g., further drawing, spraying, etc.

Any suitable method may be used to couple the individual layers of the multi-layered composite together, including, for example, thermal bonding, adhesive bonding, powdered binder bonding, hydroentangling, needlepunching, calendering, or a combination thereof. Any such bonding operation may be done in-line with a web-producing operation; or the first and second individual webs may be wound into a storage rolls until such time as it is desired to be further processed. In some embodiments, the bonding may involve a thermal treatment (defined broadly herein as meaning exposure of the mat of meltspun, collected fibers to a temperature of at least about 80° C.), which may have particular advantages as discussed herein.

In some embodiments the thermal bonding of the layers may take the form of autogenous bonding, defined herein as melt-bonding of fibers to each other at points of contact therebetween, such bonding being performed at an elevated temperature without the application of solid contact pressure onto the mat. In particular embodiments, the autogenous bonding may take the form of through-air bonding, as achieved by forcefully passing a stream of heated air through the mats of collected fibers. Such bonding may be performed, e.g., by the use of through-air bonder 550 downstream from the first and second stations 500, 600. Exemplary through-air bonders are discussed in detail in U.S. Pat. No. 9,139,940 (Berrigan) (which refers to these exemplary through-air bonders as quenched-flow heaters). Further guidance on autogenous bonding of fiber mats can be found, for example, in U.S. Pat. No. 8,240,484 (Fox et al.) and 10,273,612 (Song et al.).

In order that the disclosure described herein can be more fully understood, the following examples are set forth. It should be understood that these examples are for illustrative purposes only, and are not to be construed as limiting this disclosure in any manner.

EXAMPLES

TABLE 1

Materials

| Material | Supplier |
|---|---|
| BioPBS FZ71 | Poly butylene succinate, available from PTT MCC Biochem Company Limited, Bangkok, Thailand |

TABLE 1-continued

Materials

| Material | Supplier |
|---|---|
| BioPBS FD92 | Poly butylene succinate, available from PTT MCC Biochem Company Limited, Bangkok, Thailand |
| Ingeo PLA 6202 | Polylactide, available from NatureWorks LLC, Minnentonka, MN (USA) |
| Ingeo PLA 6252 | NatureWorks LLC, Minnentonka, MN (USA) |
| TOTAL 3766 PP | Polypropylene, available from Total S.A, Courbevoie, France |
| Ingeo PLA 6302 | Polylactide, available from NatureWorks LLC, Minnentonka, MN (USA) |
| Adipic acid | Adipic Acid nucleating agent, available from Sigma-Aldrich Corporation, St. Louis, MO (USA) |

Percent (%) Penetration, Pressure Drop, and Quality Factor

Percent (Particle) Penetration, Pressure Drop and the filtration Quality Factor (QF) of the nonwoven fibrous webs can be determined using a challenge aerosol containing DOP (dioctyl phthalate) liquid droplets, delivered (unless otherwise indicated) at a flow rate of 85 liters/min to provide a face velocity of 14 cm/s, and evaluated using a TSI (Registered Trademark) Model 8130 high-speed automated filter tester (commercially available from TSI Inc., Shoreview, Minn.). For DOP testing, the aerosol may contain particles with a diameter of about 0.185 m, and the Automated Filter Tester may be operated with the heater off and the particle neutralizer on. Calibrated photometers may be employed at the filter inlet and outlet to measure the particle concentration and the % particle penetration through the filter. An MKS pressure transducer (commercially available from MKS Instruments, Wilmington, Mass.) may be employed to measure the Pressure Drop (ΔP, mm H2O) through the filter. The equation:

$$QF = \frac{-\ln\left(\frac{\% \text{ Particle Penetration}}{100}\right)}{\Delta P}$$

may be used to calculate QF from the Pressure Drop and Percent (Particle) Penetration.

Dust Holding Capacity (DHC)

The Dust Holding Capacity (and other filtration properties such as, e.g., Capture Efficiency, Arrestance, and Minimum Efficiency Reporting Value (MERV)) of filters can be measured in accordance with the general methods in ASHRAE Standard 52.2 ("Method of Testing General Ventilation Air-Cleaning Devices for Removal Efficiency by Particle Size"). The Dust Holding Capacity test involves configuring the web as a filter (e.g., a pleated and/or framed filter), installing the filter into a test duct and subjecting the filter to incremental dust loading steps, using a synthetic dust as specified in the ASHRAE 52.2 standard. The Dust Holding Capacity is the total weight of the synthetic dust captured by the air-filter sample over all of the incremental dust loading steps. The Dust Holding Capacity for all samples can be normalized to the surface area of the air-filter sample and is reported in grams of dust per square meter.

Fiber Bundling Index

The Effective Fiber Diameter (EFD) of a web is evaluated according to the method set forth in Davies, C. N., 'The Separation of Airborne Dust and Particles,' Institution of Mechanical Engineers, London, Proceedings IB, 1952. Unless otherwise noted, the test is run at a face velocity of 14 cm/sec. The Actual Fiber Diameter (AFD) of fibers in a web is evaluated by imaging the web via a scanning electron microscope at 500 times or greater magnification and utilizing an Olympus DP2-BSW image analysis program. At least 100 individual diameter measurements are obtained for each web sample and the mean of these measurements is reported as the AFD for that web.

Examples 1-8

Examples 1-8 were created to examine the Fiber Bundling Index and Pressure Drop of multilayer composite webs. Comparative Examples with spunbonded polypropylene fibers, prepared in the same general manner as described in U.S. Pat. No. 8,240,484 (Fox et al.), were also examined.

Preparation of the Web

The multi-layered composite Examples were prepared as follows, using an apparatus of the type depicted in FIG. 6. In Step 1, the PBS/PLA sheath/core filaments are extruded at a temperature of 200° C. to 230° C. (sheath) and 230° C. (core), then drawn by quench air at 10° C. and the flowrates of 23 m³/min in Zone 1 and 23 m³/min in Zone 2, to form a PBS/PLA spunbond first composite layer. PLA monocomponent filaments are extruded at 230° C., then drawn by a quench air at 15° C. and the flowrate of 12 m³/min, to lay on the first composite layer to form a dual-layer web. The dual-layer web then passed through a through-air bonding station (i.e., were autogenously bonded), where a hot air of 100° C.-125° C.-130° C. was blown on the dual-layer web to thermally bond the dual-layer web.

TABLE 2

Spunbonded Web Layer Composition

| Example | Sheath Composition | Core Composition | Sheath/Core |
|---|---|---|---|
| Example 1 | Sheath: BioPBSFZ71 and Ingeo PLA 6202 blend (80 wt. % PBS/20 wt. % PLA), and Adipic acid | Ingeo PLA 6202 | 30 wt. % Sheath 70 wt. % Core |
| Example 2 | Sheath: BioPBSFD92 and Ingeo PLA 6252 blend (80 wt. % PBS/20 wt. % PLA) | Ingeo PLA 6252 | 8 wt. % Sheath 92 wt. % Core |
| Example 3 | Sheath: BioPBSFD92 and Ingeo PLA 6252 blend (80 wt. % PBS/20 wt. % PLA) | Ingeo PLA 6202 | 12 wt. % Sheath 88 wt. % Core |
| Example 4 | Sheath: BioPBSFZ71 and Ingeo PLA 6202 blend (60 wt. % PBS/40 wt. % PLA), and Adipic acid | Ingeo PLA 6202 | 12 wt. % Sheath 88 wt. % Core |
| Example 5 | Sheath: BioPBSFZ71 and Ingeo PLA 6202 blend (60 wt. % PBS/40 wt. % PLA), and Adipic acid | Ingeo PLA 6202 | 30 wt. % Sheath 70 wt. % Core |
| Example 6 | Sheath: BioPBSFZ71 and Ingeo PLA 6202 blend (80 wt. % PBS/20 wt. % PLA), and Adipic acid | Ingeo PLA 6202 | 12 wt. % Sheath 88 wt. % Core |
| Example 7 | Sheath: BioPBSFZ71 and Ingeo PLA 6202 blend (80 wt. % PBS/20 wt. % PLA), and Adipic acid | Ingeo PLA 6202 | 30 wt. % Sheath 70 wt. % Core |
| Example 8 | Sheath: BioPBSFZ71 and Ingeo PLA 6302 blend (60 wt. % PBS/40 wt. % PLA), | Ingeo PLA 6202 | 30 wt. % Sheath 70 wt. % Core |

TABLE 2-continued

Spunbonded Web Layer Composition

| Example | Sheath Composition | Core Composition | Sheath/Core |
|---|---|---|---|
| Comparative 1 | and Adipic acid Not applicable | Total 3766 PP | 100% Core |
| Comparative 2 | Not applicable | Total 3766 PP | 100% Core |
| Comparative 3 | Not applicable | Total 3766 PP | 100% Core |

The Pressure Drop and Fiber Bundling Index results, as well as the basis weight, are provided in Table 3.

TABLE 3

Performance for Examples E1-E8 and Comparatives 1-3

| | Example | | | | | | | | | | |
|---|---|---|---|---|---|---|---|---|---|---|---|
| | E1 | E2 | E3 | E4 | E5 | E6 | E7 | E8 | Comp 1 | Comp 2 | Comp 3 |
| Basis Weight (gsm) | 30 | 30 | 30 | 30 | 30 | 30 | 30 | 30 | 40 | 50 | 55 |
| EFD (microns) | 52 | 62 | 79 | 62 | 48.8 | 102 | 57 | 64.2 | 29 | 28 | 27.5 |
| AFD (microns) | 15 | 16 | 17 | 18 | 18.8 | 18 | 18.7 | 14.9 | 22.6 | 22.5 | 18.7 |
| FBI | 3.51 | 3.78 | 4.54 | 3.44 | 2.60 | 5.67 | 3.05 | 4.31 | 1.28 | 1.24 | 1.47 |
| Pressure Drop (mm $H_2O$) | 0.03 | 0.025 | 0.015 | 0.0175 | 0.0338 | 0.0075 | 0.025 | 0.023 | 0.2 | 0.32 | 0.36 |

Example 9

Example 9 was created to examine the Fiber Bundling Index and Pressure Drop of multilayer composite webs featuring multicomponent fibers in each layer.

Preparation of the Web

The multi-layered composite Examples were prepared as follows, using an apparatus of the type depicted in FIG. 6. In Step 1, the PBS/PLA sheath/core filaments are extruded at a temperature of 200° C. to 230° C. (sheath) and 230° C. (core), then drawn by quench air at 10° C. and the flowrates of 23 m³/min in Zone 1 and 23 m³/min in Zone 2, to form a PBS/PLA spunbond first composite layer. In Step 2, PBS/PLA sheath/core filaments are extruded at a temperature of 200° C. to 230° C. (sheath) and 230° C. (core), then drawn by quench air at 10° C. and the flowrates of 23 m³/min in Zone 1 and 23 m³/min in Zone 2, to form a PBS/PLA spunbond second composite layer to lay on the first composite layer to form a dual-layer web. The dual-layer web then passed through a through-air bonding station (i.e., were autogenously bonded), where a hot air of 100° C.-125° C.-130° C. was blown on the dual-layer web to thermally bond the dual-layer web.

TABLE 4

First Spunbonded Web Layer Composition

| Example | Sheath Composition | Core Composition | Sheath/Core |
|---|---|---|---|
| Example 9 | Sheath: BioPBSFZ71 and Ingeo PLA 6202 blend (80 wt. % PBS/20 wt. % PLA), and Adipic acid | Ingeo PLA 6202 | 30 wt. % Sheath 70 wt. % Core |

TABLE 5

Second Spunbonded Web Layer Composition

| Example | Sheath Composition | Core Composition | Sheath/Core |
|---|---|---|---|
| Example 9 | Sheath: BioPBSFZ71 and Ingeo PLA 6202 blend (60 wt. % PBS/40 wt. % PLA), and Adipic acid | Ingeo PLA 6202 | 30 wt. % Sheath 70 wt. % Core |

TABLE 6

Performance for Examples E9

| Example | E9 |
|---|---|
| Basis Weight (gsm) | 65 |
| EFD (microns) | 36.8 |
| AFD (microns) | 15 |
| FBI | 2.45 |
| Solidity | 5.23% |
| Pressure Drop (mm $H_2O$) | 0.15 |
| Dust Holding Capacity | 38.8 g/m² |

The recitation of all numerical ranges by endpoint is meant to include all numbers subsumed within the range (i.e., the range 1 to 10 includes, for example, 1, 1.5, 3.33, and 10).

The patents, patent documents, and patent applications cited herein are incorporated by reference in their entirety as if each were individually incorporated by reference. It will be apparent to those of ordinary skill in the art that various changes and modifications may be made without deviating from the inventing concepts set from above. Thus, the scope of the present disclosure should not be limited to the structures described herein. Those having skill in the art will appreciate that many changes may be made to the details of the above-described embodiments and implementations without departing from the underlying principles thereof. Further, various modifications and alterations of the present disclosure will become apparent to those skilled in the art without departing from the spirit and scope of the invention. The scope of the present application should, therefore, be determined only by the following claims and equivalents thereof.

We claim:

1. A multi-layered composite comprising:
    a first layer comprising a first nonwoven web, the web including multicomponent fibers; and
    a second layer comprising a second nonwoven web adjacent the first layer, wherein the first layer has a Fiber Bundling Index of at least 2.

2. The multi-layered composite of claim 1, wherein the multicomponent fibers include a first component that contains at least one high-melting point aliphatic polyester and a second component including a least one low-melting point aliphatic polyester.

3. The multi-layered composite of claim 2, wherein the melting point of the low-melting point aliphatic polyester is at least about 20 degrees C. less than the melting point of the high-melting point aliphatic polyester.

4. The multi-layered composite of claim 1, wherein the first nonwoven web is a spunbonded web.

5. The multi-layered composite of claim 1, wherein the second nonwoven web is a spunbonded web.

6. The multi-layered composite of claim 1, wherein the multicomponent fibers include one of:
    a sheath comprising PBS and a core comprising PLA, and
    a sheath comprising PLA and a core comprising PBS.

7. The multi-layered composite of claim 6, wherein the fiber includes a sheath comprising PBS and a core comprising PLA, wherein the fiber includes between about 60-95 wt. % PLA and 5-40 wt. % PBS.

8. The multi-layered composite of claim 1, wherein the composite is dimensionally stable.

9. The multi-layered composite of claim 7, wherein the composite does not include polypropylene stabilizing agents.

10. The multi-layered composite of claim 1, wherein the second nonwoven web includes monocomponent fibers or bicomponent fibers.

11. The multi-layered composite of claim 10, wherein the monocomponent fibers or bicomponent fibers include PLA.

12. The multi-layered composite of claim 1, wherein the first nonwoven layer has a Fiber Bundling Index of at least 2.

13. A flat panel air filter or pleated air filter comprising a multi-layered composite, the composite comprising:
    a first layer comprising a first spunbonded web, the web including bicomponent fibers; and
    a second layer comprising a second spunbonded web affixed to the first layer,
    wherein the bicomponent fibers include a sheath comprising one of PBS, or a PBS/PLA blend,
    wherein the biocomponent fibers include a core comprising PLA,
    wherein the second spunbonded web includes PLA,
    wherein the composite lacks at least one of a viscosity modifier and a polypropylene stabilizing additive.

14. The air filter of claim 13, wherein the filter has a Dust Holding Capacity of at least 40.

15. The air filter of claim 14, wherein the filter has a Dust Holding Capacity of at least 50.

16. The air filter of claim 13 and demonstrating a pressure drop of no greater than 0.15 mmH$_2$O.

17. The air filter of claim 13, wherein the filter is biodegradable.

18. A multi-layered composite comprising:
    a first layer comprising a first spunbonded web, the web including bicomponent fibers; and
    a second layer comprising a second spunbonded web affixed to the first layer and including bicomponent fibers, wherein the bicomponent fibers in each web include a sheath comprising one of PBS or a PBS/PLA blend, and a core comprising PLA.

19. The multi-layered composite of claim 18, wherein the bicomponent fibers in at least the first web include a nucleating agent.

* * * * *

UNITED STATES PATENT AND TRADEMARK OFFICE
CERTIFICATE OF CORRECTION

PATENT NO. : 12,109,520 B2
APPLICATION NO. : 17/422560
DATED : October 8, 2024
INVENTOR(S) : Zhiqun Zhang et al.

It is certified that error appears in the above-identified patent and that said Letters Patent is hereby corrected as shown below:

In the Claims

<u>Column 19</u>
Line 25, In Claim 2, delete "a least" and insert -- at least --, therefor.

Signed and Sealed this
Thirteenth Day of May, 2025

Coke Morgan Stewart
*Acting Director of the United States Patent and Trademark Office*